UNITED STATES PATENT OFFICE.

ALBRECHT HEIL, OF FRANKFORT-ON-THE-MAIN, GERMANY, ASSIGNOR OF ONE-HALF TO CONRAD HUBERT AND ONE-HALF TO SAMUEL STERN, BOTH OF NEW YORK, N. Y.

GALVANIC CELL.

1,053,390.

Specification of Letters Patent. Patented Feb. 18, 1913.

No Drawing. Application filed January 3, 1911. Serial No. 600,567.

*To all whom it may concern:*

Be it known that I, ALBRECHT HEIL, a subject of the German Emperor, and resident of Frankfort-on-the-Main, Germany, have invented certain new and useful Improvements in Galvanic Cells, of which the following is a specification.

The present invention relates to a galvanic battery, which is characterized by a high output with small weight and long durability, hitherto not obtained. These characteristics are obtained by employing as the substance acting as the depolarizer, not manganese dioxid, for example pyrolusite or a suitable sulfate, chlorid or the like, but the dark brown manganic hydrate, which is the hydrate of the sesquioxid of manganese, and which corresponds in chemical composition to the formula $Mn(OH)_3$, and which readily conducts electricity. If this dark brown powder is intimately mixed with finely powdered carbon (graphite) and used in the ordinary manner as the depolarizing electrode in a porous envelop with a carbon element opposed to a zinc element in ammonium nitrate or ammonium chlorid solution or the like, a battery is thus obtained whose depolarized electrode, with the same weight and the same electrolyte, has about 100% greater efficiency than a depolarizing electrode of the best and purest pyrolusite. Experiments have shown that 70 parts by weight manganic hydrate can advantageously replace 240 parts by weight of the highest percentage of pyrolusite. Such batteries give a very constant and strong current, keep excellently during periods of rest and produce no exhalations, for which reason dry batteries can also be very advantageously manufactured in this manner. The electromotive force is 1.6 volts. The internal resistance is somewhat smaller than in the pyrolusite battery, while its recovering capacity is greater than in the Leclanché battery.

The dark brown manganic hydrate may be readily made from manganous hydrate, which is of light yellow color and is a very poor conductor of electricity. If this light yellow manganous hydrate is given a long exposure to the atmosphere it is oxidized and becomes dark brown manganic hydrate, or if it is brought while in a moist condition into an atmosphere rich in oxygen a like oxidation takes place.

I claim:

1. A galvanic cell comprising positive and negative elements, and a depolarizing mass composed of an intimate mixture of dark brown manganic hydrate and carbon.

2. A galvanic cell comprising positive and negative elements, and a depolarizing mass containing dark brown manganic hydrate.

3. A galvanic cell comprising a positive zinc element, a negative carbon element, and a depolarizing mass for the negative carbon element consisting of an intimate mixture of dark brown good-conducting manganic hydrate and carbon.

4. A galvanic cell comprising a positive zinc element, a negative carbon element, and a depolarizing mass for the negative carbon element containing dark brown good-conducting manganic hydrate.

In testimony whereof I have hereunto set my hand in presence of two witnesses.

ALBRECHT HEIL.

Witnesses:
JEAN GRUND,
CARL GRUND.